United States Patent [19]
Masunaga

[11] Patent Number: 5,264,968
[45] Date of Patent: Nov. 23, 1993

[54] LENS DRIVE APPARATUS IN OPTICAL PICKUP AND METHOD OF PRODUCING THE SAME

[75] Inventor: Yoshifumi Masunaga, Tokorozawa, Japan

[73] Assignee: Pioneer Electronic Corporation, Tokyo, Japan

[21] Appl. No.: 887,818

[22] Filed: May 26, 1992

[30] Foreign Application Priority Data

May 27, 1991 [JP] Japan .................. 3-121447

[51] Int. Cl.⁵ .............................................. G02B 7/02
[52] U.S. Cl. .................... 359/824; 359/814; 369/44.16
[58] Field of Search ............... 359/819, 813, 814, 823, 359/824, 822; 369/44.15, 44.16

[56] References Cited

U.S. PATENT DOCUMENTS

| | | | |
|---|---|---|---|
| 4,669,823 | 6/1987 | Iguma et al. | 359/824 |
| 4,927,235 | 5/1990 | Narumi | 359/814 |
| 4,948,230 | 8/1990 | Kasahara et al. | 359/823 |
| 4,991,161 | 2/1991 | Ikegame et al. | 369/44.15 |
| 5,018,836 | 5/1991 | Noda et al. | 359/814 |
| 5,046,820 | 9/1991 | Saekusa et al. | 359/814 |
| 5,056,891 | 10/1991 | Masunaga | 359/813 |
| 5,068,844 | 11/1991 | Tanaka | 369/44.16 |
| 5,072,433 | 12/1991 | Tanaka | 369/44.16 |

FOREIGN PATENT DOCUMENTS

| | | |
|---|---|---|
| 0144445 | 6/1985 | European Pat. Off. . |
| 0394032 | 10/1990 | European Pat. Off. . |
| 62-36741 | 2/1987 | Japan . |
| 3-266233 | 11/1991 | Japan . |

OTHER PUBLICATIONS

Patent Abstracts of Japan, vol. 11, No. 219 (p596) Jul. 16, 1987.
Patent Abstracts of Japan, vol. 16, No. 78 (p1317) Feb. 25, 1992.

*Primary Examiner*—Loha Ben
*Attorney, Agent, or Firm*—Sughrue, Mion, Zinn, Macpeak & Seas

[57] ABSTRACT

A lens drive apparatus and its producing method are provided in which the productivity is improved and the assembly of components is conducted at high accuracy. In particular, a movable optical system containing an objective lens and a stationary base are coupled by elongated resilient members which serve as suspensions and are provided at both ends with joining members made of a resin material. The resilient members and the joining members are formed in combination by insertion-molding. Accordingly, their assembly can be executed so that troublesome work such as directly assembling the resilient members of delicate size is avoided, no exceptional skill is needed, and less steps are involved for ease of production, thus increasing the productivity. Also, the joining members are comparatively large in size and can thus be mounted at high positional accuracy to both the stationary base and the movable optical system. The joining members and the resilient members are coupled at high accuracy to each other by means of insert-molding. Hence, the positional relation between the stationary base and the movable optical system will highly be enhanced in accuracy.

14 Claims, 15 Drawing Sheets

LENS DRIVE APPARATUS IN OPTICAL PICKUP AND METHOD OF PRODUCING THE SAME

BACKGROUND OF THE INVENTION

1. Field of the Invention

The present invention relates to a lens drive apparatus in an optical pickup and a method of producing the same.

2. Description of the Prior Art

An optical pickup is provided for converging beams of light into a spot on a recording track arranged on the data recording surface of a recording disk which serves as a data recording medium to read data from the recording track by means of change in the reflected light. For correct convergence of the light beams on the recording track to be retrieved, the pickup allows its objective lens for beam convergence to move a minimal distance in the direction of the optical axis in the focus servo action to compensate for surface deviation caused by the deflection of a recording disk. Also, the objective lens is arranged to move a minimal distance at a right angle to the recording track in the tracking servo action for correct tracing of the light spot along the recording track regardless of eccentricity of the recording track.

Such a conventional optical pickup provided with a lens drive apparatus for servo drive action of the objective lens is shown at its primary section in FIGS. 1 and 2.

As shown in FIG. 1, the optical pickup has a hollow pickup body 141 and an actuator base 142 fixedly installed in the pickup body 141. The pickup body 141 and the actuator base 142 constitute in combination a base section of the optical pickup. The optical pickup is arranged for linear movement along a guide mechanism, not shown, to scan the data recording surface of a disk 143 which is placed on a turn table, not shown, for rotating movement. More specifically, the guide mechanism is a linear guide shaft with which the pickup body 141 is slidably engaged. The optical pickup is driven by a pickup drive means (not shown).

The pickup body 141 contains optical devices for performing a substantial task of the pickup including a semiconductor laser 144 serving as a light emitter means for emission of light beam and a prism 145 for reflecting the light beam at a right angle to run towards an objective lens 147. The light beam from the semiconductor laser 144 is focused by the objective lens 147 to a spot of light on the data recording surface of the disk.

The objective lens 147 is mounted to the uppermost end of a lens holder 148 of cylindrical shape. As best shown in FIG. 2, the lens holder 148 has a focusing coil 150 wound on the circumferential surface thereof so that the center axis of the focusing coil 150 comes in parallel to the optical axis of the objective lens 147. The focusing coil 150 is coupled at outer end to a plurality, e.g. four, of tracking coils 151 of which center axes extend at right angles to the optical axis of the objective lens 147. In more particular, each tracking coil 151 wound into an annular shape is attached to the focusing coil 150. A movable optical system consisted of the objective lens 147 and the lens holder 148 is supported at one end by two pairs or four of elongated suspension resilient members 153 which are arranged parallel to each other and extend at right angles to the optical axis of the objective lens 147 and along a first direction denoted by X of FIG. 2. FIG. 2 illustrates three of the four resilient members 153. Each resilient member 153 is mounted at one end to an upwardly extending upright portion 142a of the actuator base 142 in cantilever arrangement. The actuator base 142 also has a through opening 142c therein across which the optical path extends. The resilient member 153 is formed of e.g. a spring steel material for having resiliency. Accordingly, the movable optical system consisted of the objective lens 147 and the lens holder 148 can be moved in two directions; the direction of the optical axis of the objective lens (denoted by F in FIG. 2) and a second direction (denoted by T) designated at right angles to the optical axis of the objective lens 147 and to the first direction (denoted by X). The optical axis of the objective lens 147 extends in a focusing direction designated vertical to the data recording surface of the disk. Hence, the second direction is equal to a tracking direction which extends at a right angle to the recording track of the data recording surface.

The focusing coil 150 and the tracking coils 151 are arranged to be in a magnetic gap of a magnetic circuit which comprises a magnet 155 and a yoke 156. The magnetic gap yields a parallel magnetic flux extending at a right angle to both the coils 150 and 151. Hence, when the coils 150 and 151 are energized with given currents respectively, they produce drive forces to move the movable optical system in the F and/or T directions.

The procedure of assembling the lens drive apparatus of the conventional optical pickup will be explained referring to FIG. 3.

As shown, the lens drive apparatus is assembled using a specific tooling 158. The tooling 158 comprises a support 158a of planar form for supporting the actuator base 142 and an integrally formed extension 158b extending upwardly from one end of the support 158a in parallel with the upright 142a of the actuator base 142. The support 158a has at center an upwardly extending pillar 158c. Also, a small pillar 158d is coaxially mounted to the uppermost of the center pillar 158c, thus projecting upwardly. In assembly, the actuator base 142 is first loaded onto the tooling 158 with its opening 142c accepting the center pillar 158c. The upright 142a of the actuator base 142 is then tightened by a screw 160 to the extension 158b of the tooling 158. The actuator base 142 carries the magnets 155 and the yokes 156 installed therein. Then, the lens holder 148 is attached to the top of the center pillar 158c. The lens holder 148 carries the focusing coil 150 and the tracking coils 151 assembled preliminarily while the objective lens 147 remains unloaded at the time. The lens holder 148 is tightened by a screw 161 to the tooling 158 with its optical path center opening 148a accepting the small pillar 158d. As the result, the actuator base 142 and the lens holder 148 both are fixedly mounted to the tooling 158 and their relative positioning is completed. Then, the four resilient members 153 shown in FIG. 2 are loaded by an operator. More particularly, the four resilient members 153 are bonded one by one between the upright 142a of the actuator base 142 and the lens holder 148 by application of an adhesive. After bonding the resilient members 153, the two screws 160 and 161 are loosened and an assembled unit is dismounted from the tooling 158. Then, other assembly steps including the mounting of the objective lens 147 to the lens holder 148 will follow.

As understood, the loading and bonding of the four resilient members 153 which are small in size requires the operator to conduct a troublesome and skilled task in the procedure of assembling the conventional lens drive apparatus. Simplification of the task has thus been desired. Also, it is technically difficult during the foregoing action to increase accuracy in the positioning of such components and thus, dislocation or misassignment in the loading and bonding action will be unavoidable. Hence, the task becomes the first thing to be tackled in order to minimize defective optical pickup products.

SUMMARY OF THE INVENTION

It is an object of the present invention, in view of the above mentioned aspect, to provide a lens drive apparatus and a method of producing the same in which the productivity is improved, the assembly of components is increased in positional accuracy, and the procedure is successfully applicable to an automatic production line.

A lens drive apparatus according to the present invention which has a movable optical system containing an objective lens movably coupled by elongated resilient suspension members to a stationary base, is characterized in that the resilient members have at both ends a pair of joining members of a resin material directly bonded to the movable optical system and the stationary base respectively and further in that, the resilient members and the joining members are formed in combination by insert-molding.

A method, according to the present invention, of producing a lens drive apparatus which has a movable optical system containing an objective lens movably coupled by elongated resilient suspension members to a stationary base, comprises the steps of insert-molding in combination the resilient members and a pair of joining members of a resin material arranged for coupling the two ends of the resilient members to the movable optical system and the stationary base respectively, and fixedly bonding one of the two joining members to the movable optical system and the other to the stationary base.

As the result, the stationary base and the movable optical system can be coupled to each other at high positional accuracy by the resilient members and the joining members which are also linked to each other integrally and accurately by means of insert-molding, or insertion-molding.

DETAILED DESCRIPTION OF PREFERRED EMBODIMENTS

Preferred embodiments of the present invention will be described in the form of a lens drive apparatus and a method of producing the same, referring to the accompanying drawings.

Figure 1:
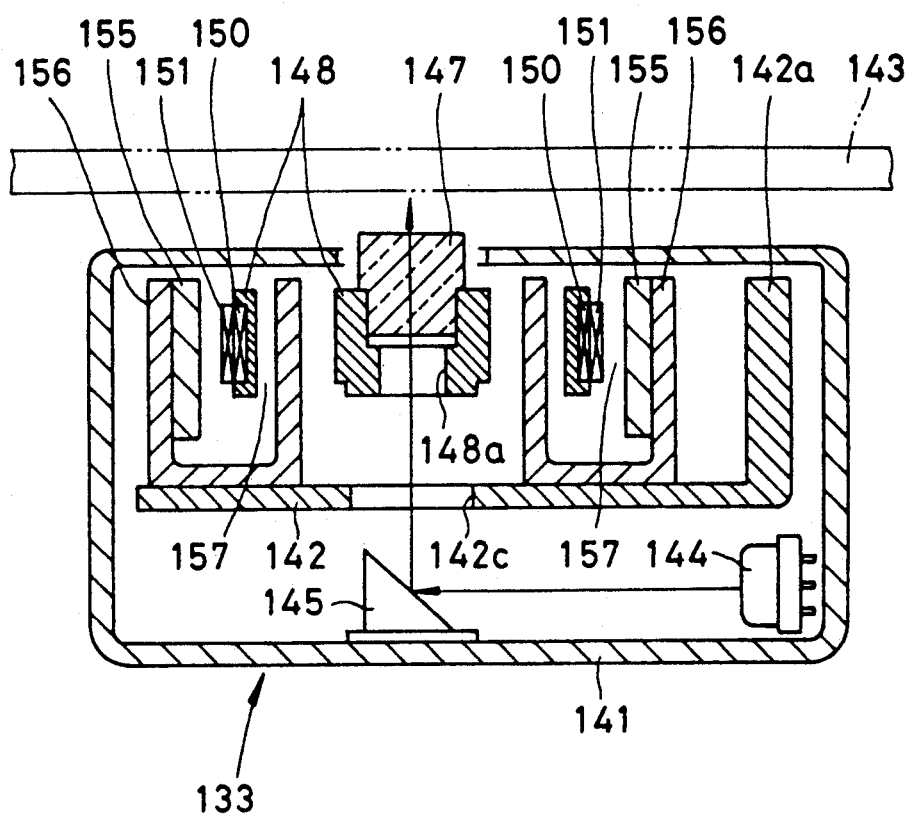
FIG. 1 is a longitudinal cross sectional view showing a primary part of a conventional optical pickup provided with a prior art lens drive apparatus.
Figure 2:
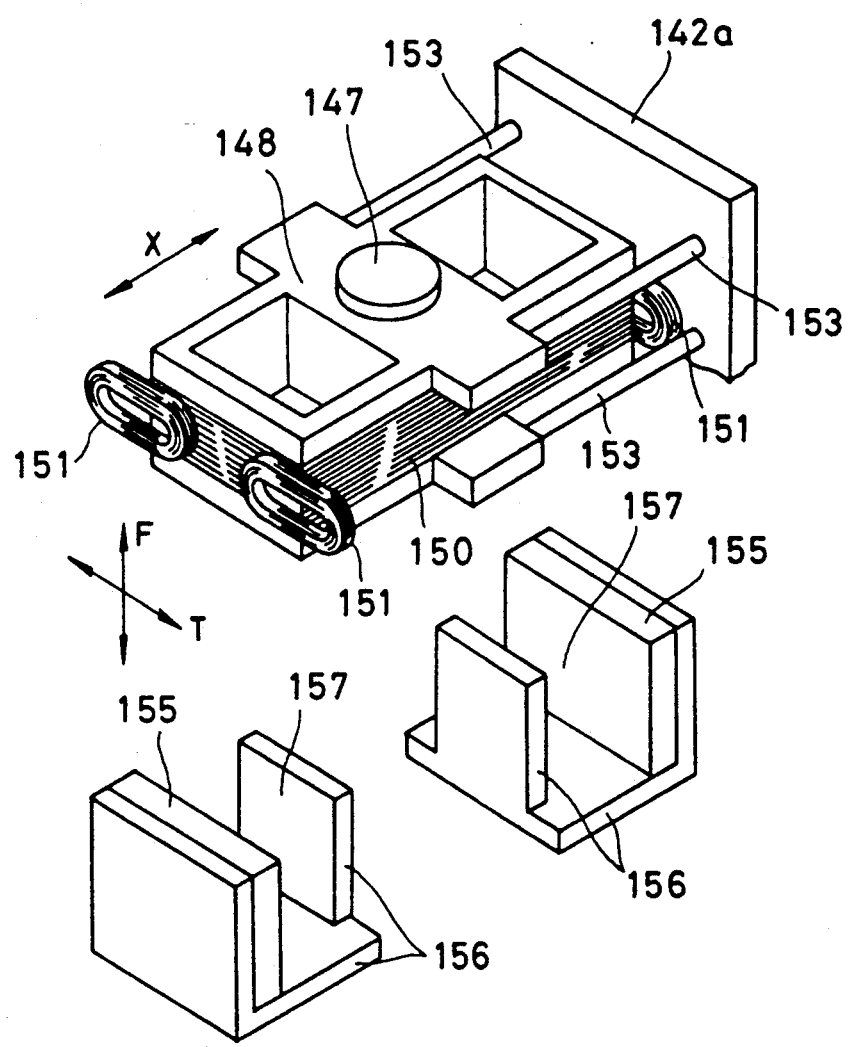
FIG. 2 is an exploded perspective view of the primary part shown in FIG. 1.
Figure 3:
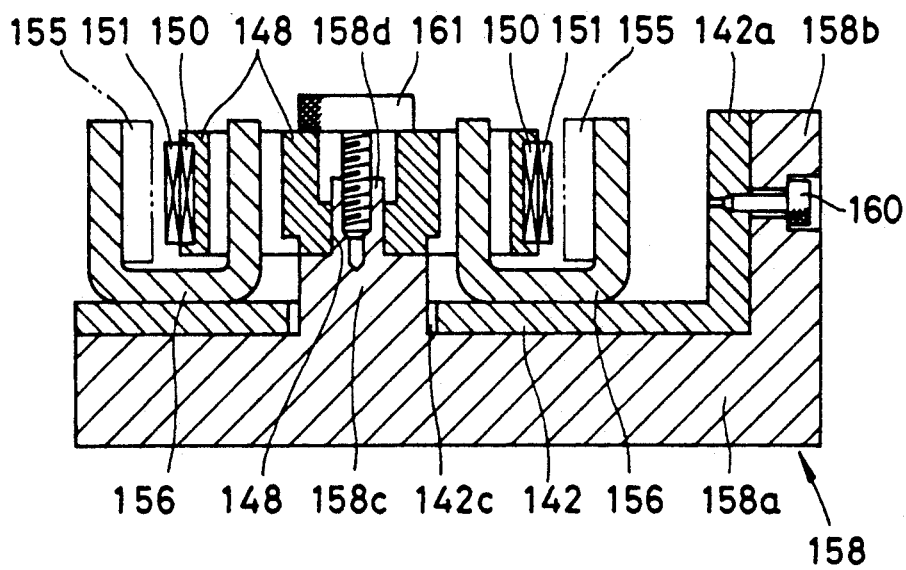
FIG. 3 is a longitudinal cross sectional view showing an assembly procedure of the lens drive apparatus shown in FIGS. 1 and 2.

FIGS. 4 to 7 illustrate a primary part of the lens drive apparatus of the present invention. The remaining part of the lens drive apparatus is identical in arrangement to that of the prior art lens drive apparatus shown in FIGS. 1 and 2 and is thus not depicted. Also, identical or similar components to those shown in FIGS. 1 and 2 are denoted by like numerals for ease of description throughout the drawings.

Figure 4:
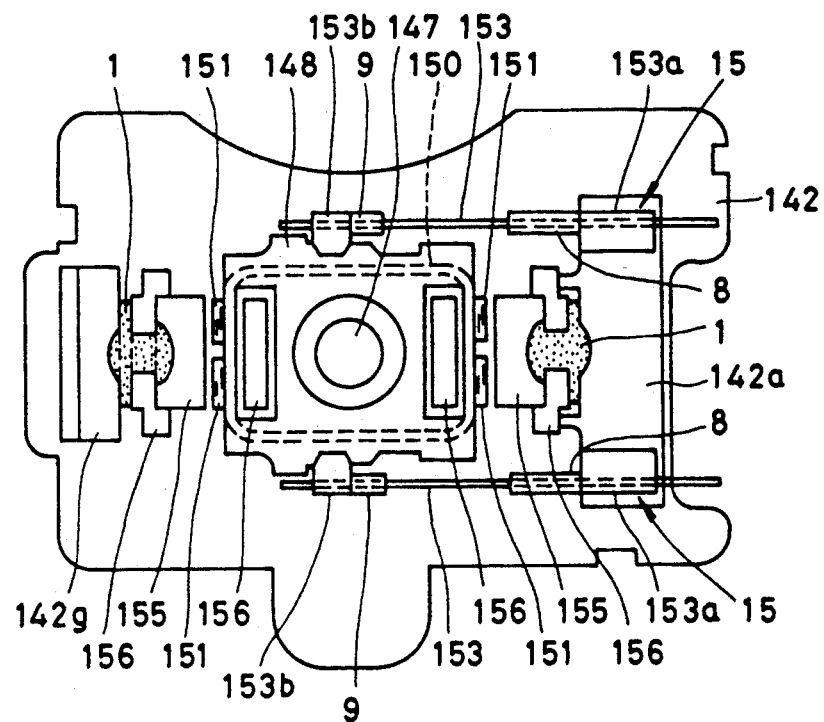
FIG. 4 is a plan view of a primary part of a lens drive apparatus showing one preferred embodiment of the present invention.
Figure 5:
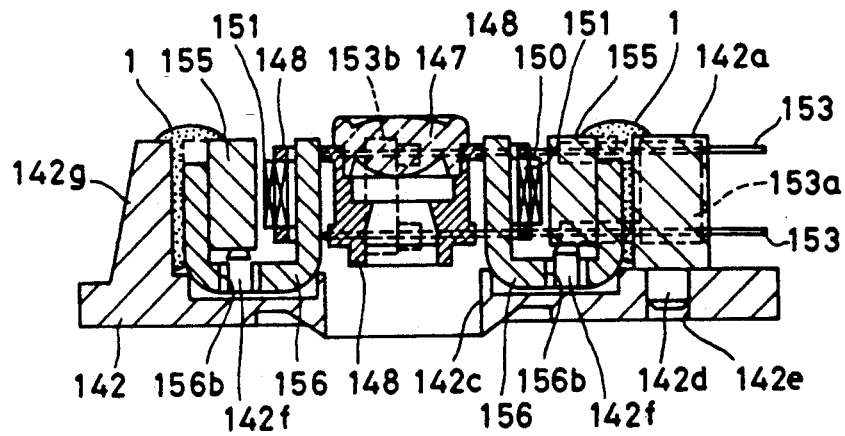
FIG. 5 is a longitudinal cross sectional view of a mechanism illustrated in FIG. 4.
Figure 6:
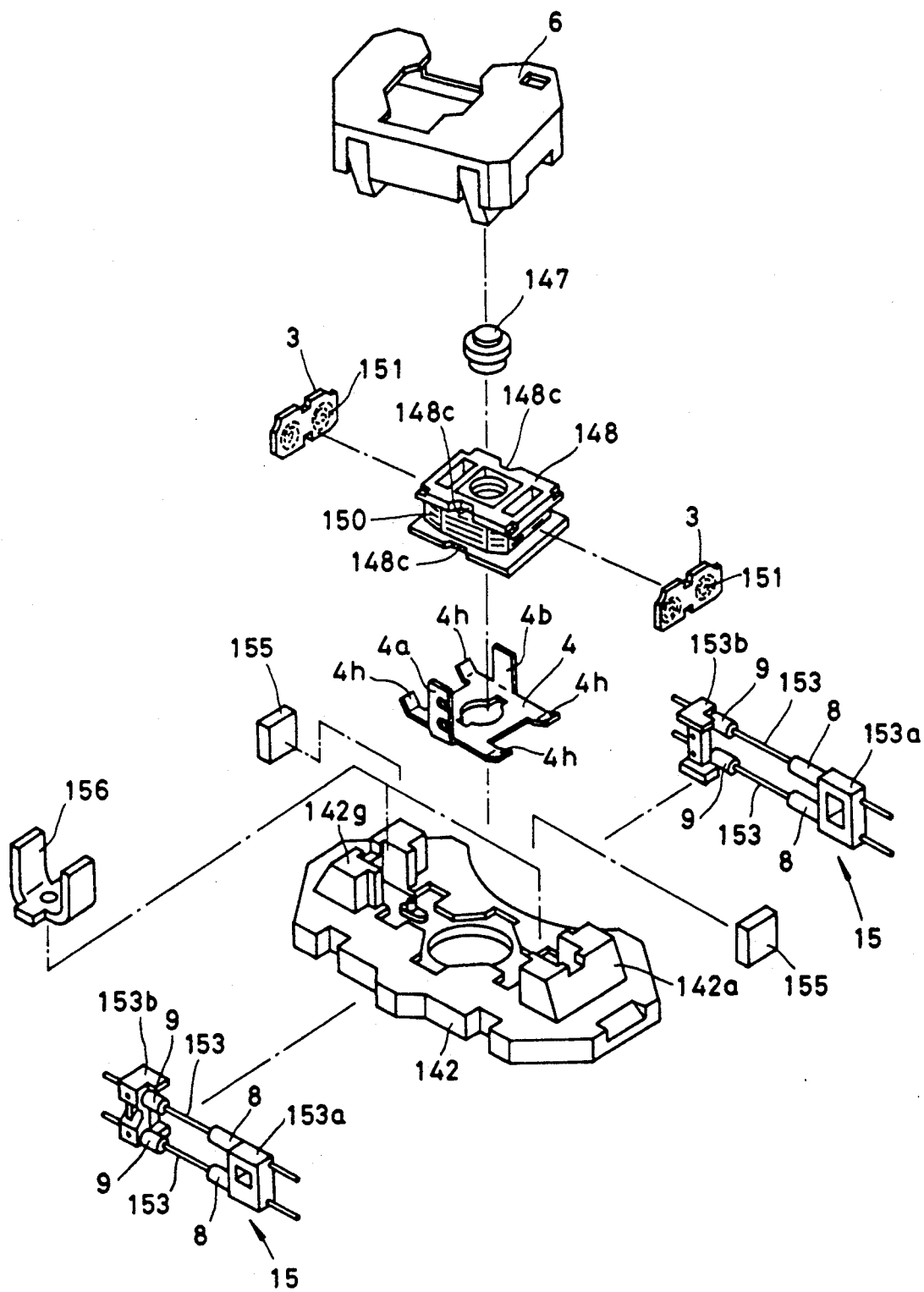
FIG. 6 is an exploded perspective view of the mechanism illustrated in FIG. 4.

As shown in FIGS. 4 to 6, the lens drive apparatus of the present invention has an actuator base 142 provided with, in addition to the upright 142a for supporting resilient members 153, an opposite upright 142g so that an objective lens 147 and its driving magnetic circuit are interposed between the two uprights 142a and 142g. The two uprights 142a and 142g extend upwardly. As best shown in FIG. 5, the upright 142a is formed separately of the main body of the actuator base 142 and thus, coupled to it for integrity by a pin 142d which extends downwardly from the lowermost end of the upright 142a and is closely fitted into a slot 142e provided in the main body of the actuator base 142. The four resilient members 153 of long shape for lens suspension are fixedly coupled at both ends to the upright 142a and the lens holder 148 by two joining blocks 153a and 153b respectively which are made of a synthetic resin material and serve as intermediate members. In particular, the joining blocks 153a, 153b and the resilient members 153 are integrally coupled to each other by an insert-molding technique which will be explained later.

FIG. 6 is an exploded perspective view of the lens drive apparatus of the present invention, in which tracking coils 151 are arranged on small-sized printed circuit boards 3 using a printed circuit technique. Also, as shown in FIG. 6, the lens holder 148 carries a printed circuit board 4 attached to the bottom thereof. Those printed circuit boards are not illustrated in FIGS. 4 and 5 for simplicity. The function of the printed circuit board 4 will be described later in more detail.

Figure 7:
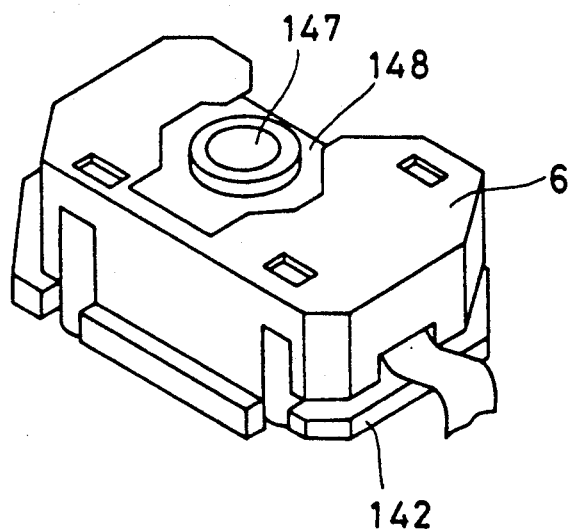
FIG. 7 is a perspective view of the mechanism illustrated in FIG. 4.

FIG. 7 is a perspective view showing the entire arrangement of the lens drive apparatus. As apparent from FIGS. 6 and 7, an actuator cover 6 is provided for accommodating the foregoing components.

Figure 8:
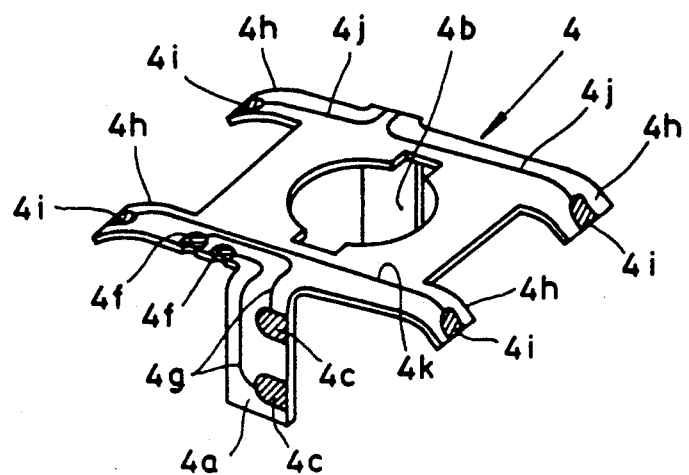
FIG. 8 is a perspective view of a printed circuit board of the mechanism illustrated in FIG. 4.
Figure 9:
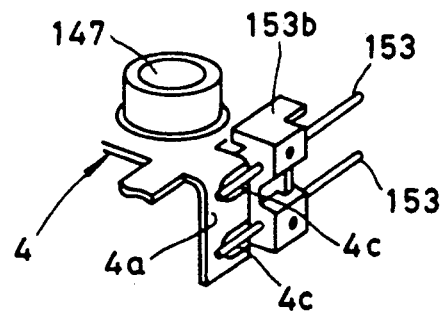
FIG. 9 is a perspective view showing the connection between a region of the printed circuit board of FIG. 8 and peripheral components.
Figure 10:
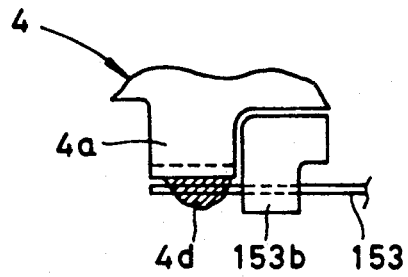
FIG. 10 is a plan view showing the connection between a region of the printed circuit board of FIG. 8 and the peripheral components.
Figure 11:
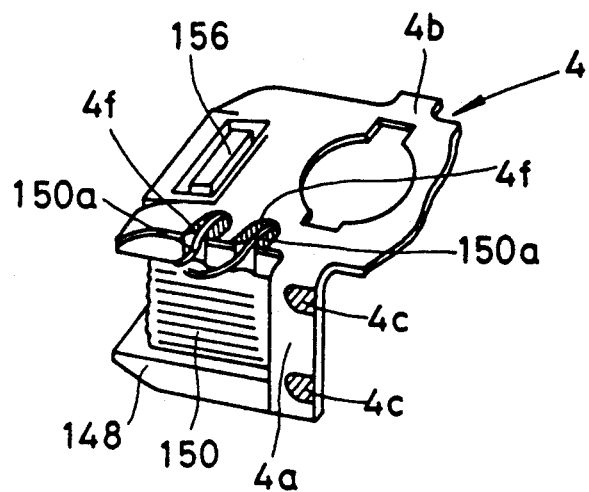
FIG. 11 is a perspective view showing the connection between a region of the printed circuit board of FIG. 8 and the peripheral components.

FIG. 8 shows an inverted state of the printed circuit board 4 depicted in FIG. 6. As apparent from FIGS. 6, 8, 9, and 10, the printed circuit board 4 has a pair of left and right erected tabs 4a, 4b thereof arranged to set adjacent to the joining blocks 153b mounted to one ends of the resilient members 153. As shown in FIGS. 9 and 10, the left erected tab 4a has two land portions 4c to which the two resilient members 153 provided in the left side are welded by drops of solder 4d (which are illustrated in FIG. 10 only). Also, the printed circuit board 4 has two land portions 4f provided near the right erected tab 4a, as shown in FIGS. 8 and 11. The two land portions 4f are connected by soldering (not shown) to both terminal ends 150a of the focusing coil 150 respectively. Also, the two land portions 4f are coupled by printed wires 4g to the two land portions 4c of the tab 4a respectively, as best shown in FIG. 8. Hence, energy can be fed from the resilient members 153 made of a conductive material, e.g. steel wire, to the focusing coil 150.

Figure 12:
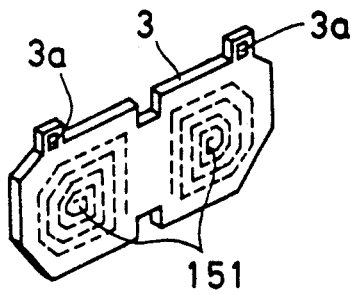
FIG. 12 is a perspective view of another printed circuit board of the mechanism illustrated in FIG. 4.
Figure 13:
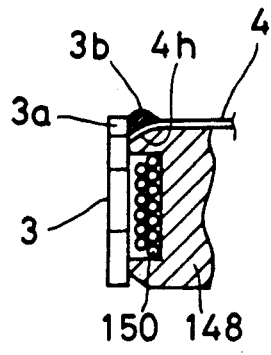
FIG. 13 is a cross sectional view showing the connection between a region of the printed circuit board of FIG. 12 and peripheral components.

As shown in FIGS. 6 and 8, the printed circuit board 4 has four projections 4h arranged at the four corners thereof. Each projection 4h has a land portion 4i. The printed circuit board 3 carrying the tracking coils 151 has a pair of land portions 3a arranged on the outer edge thereof and coupled to their respective tracking coils 151, as shown in FIG. 12. The land portion 3a is bonded by a drop of solder 3b to the land portion 4i of the projection 4h of the printed circuit board 4, as shown in FIG. 13 (which does not illustrate the land portion 4i). Also, the right erected tab 4b of the printed circuit board 4, like the left erected tab 4a, has a pair of land portions coupled by soldering to the two resilient members 153 of the right side, which are not shown. As best shown in FIG. 8, two of the four land portions 4i are connected to each other by a printed wire 4j and the other two are connected to each other by a printed wire 4k. Hence, energy from the two resilient members 153 of the right side can be fed to the tracking coils 151 in action. As the soldering is essential, the joining blocks 153a, 153b coupled to the resilient members 153 are formed of a heat-resistant resin material.

As shown in FIGS. 4 to 6, each of the four resilient members 153 has a couple of viscoelastic members 8, 9 of tabular shape formed of e.g. elastomer engineering plastic material fitted closely onto at least the proximal and distal ends thereof. FIG. 5 illustrates the viscoelastic members 8, 9 without their numerals. The viscoelastic members 8, 9 are integrally mounted to the resilient member 153 by an insert-molding technique which will be explained later.

The method of producing the lens drive apparatus having the foregoing arrangement will now be described referring to FIGS. 14 to 16.

Figure 14:
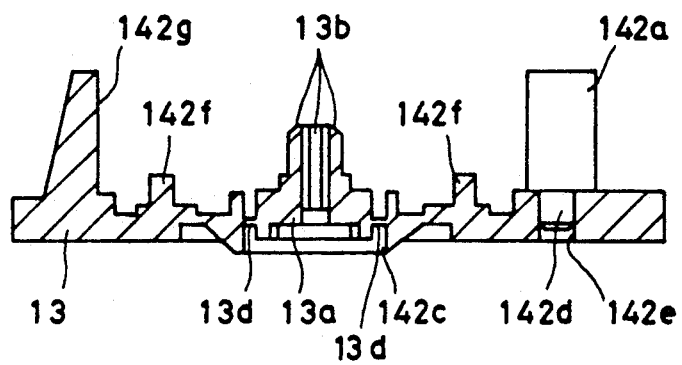
FIGS. 14 to 16 are cross sectional views of an assembly procedure of the lens drive apparatus showing one embodiment of the present invention.

As shown in FIG. 14, a plastic mold 13 which is to be turned to the actuator base 142 is first prepared by e.g. injection molding. The plastic mold 13 has an opening 142c of circular shape in cross section for passing the optical path, an upright 142g, and a pin 142f arranged integrally thereon. In addition, an upright 142a prepared separately is fixedly mounted to the plastic mold 13. Also, a positioning pillar 13a extending axially is integrally formed at the center of the opening 142c, which comprises a plurality, e.g. three, of small pillars 13b and is coupled by three joining tabs 13d to the inner wall of the opening 142c. The pillar 13a can thus be separated from the plastic mold 13 by cutting off the three tabs 13d.

Figure 15:
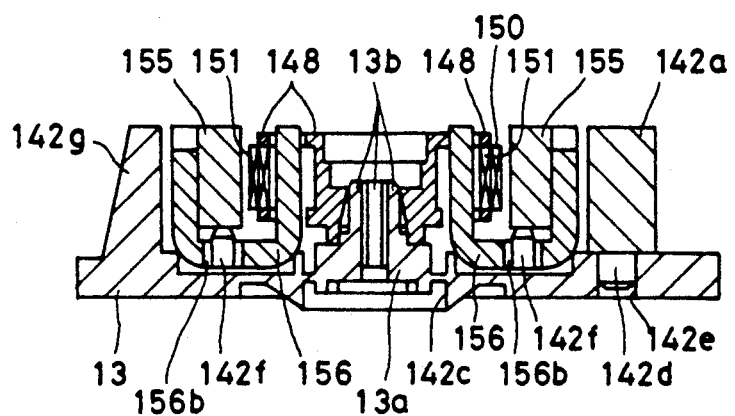

Then, a magnetic circuit comprising a magnet 155 and a yoke 156 is mounted to the plastic mold 13, as shown in FIG. 15 and the lens holder 148 is fitted onto the positioning pillar 13a. The lens holder 148 carries the focusing coil 150 and the tracking coils 151 mounted thereto preliminarily. The objective lens 147 remains unloaded at the time. The small pillars 13b of the positioning pillar 13a are arranged resilient and will be bent inwardly when the lens holder 148 is fitted on it. Accordingly, the lens holder 148 is held securely on the pillar 13 by the resiliency of the three small pillars 13b. Then, the relative positioning between the plastic mold 13 and the lens holder 148 is completed.

Figure 16:
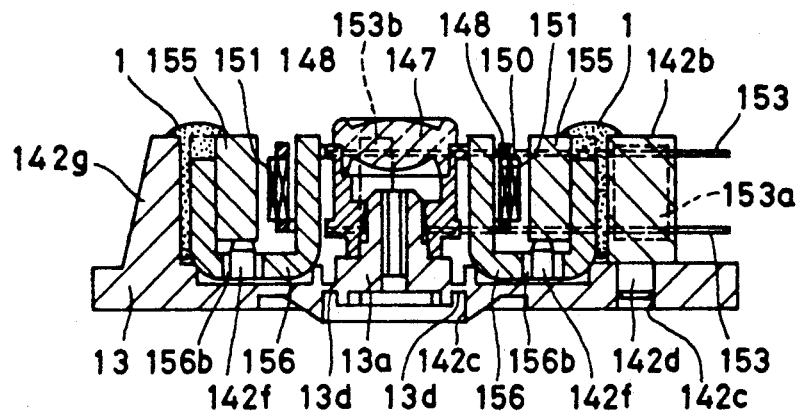

In succession, the four resilient members 153 are installed as shown in FIG. 16. More specifically, the two joining blocks 153a and 153b mounted integrally to both ends of the resilient members 153 by the insert-molding are bonded by an adhesive to the upright 142a on the plastic mold 13 and the lens holder 148 respectively. Then, the positioning pillar 13a is separated from the plastic mold 13. The joining tabs 13d are partially arranged to have a small thickness region and can be cut easily. As the result, the lens drive apparatus shown in FIGS. 4 to 7 will be fabricated.

The spaces between the uprights 142a, 142g and the magnetic circuit unit, shown in FIG. 15, are filled with a viscoelastic material 1 which is provided in a molten state for filling and then, solidified with time.

The fabrication of a suspension unit 15 which is a primary component of the lens drive apparatus as shown in FIGS. 4, 5, 6, 16, 17, 18, and 19 (where its numeral is omitted in FIGS. 5 and 16) or more particularly, an insert-molding component which comprises the resilient members 153, the joining blocks 153a, 153b, and the viscoelastic members 8, 9 will now be described.

Figure 20:
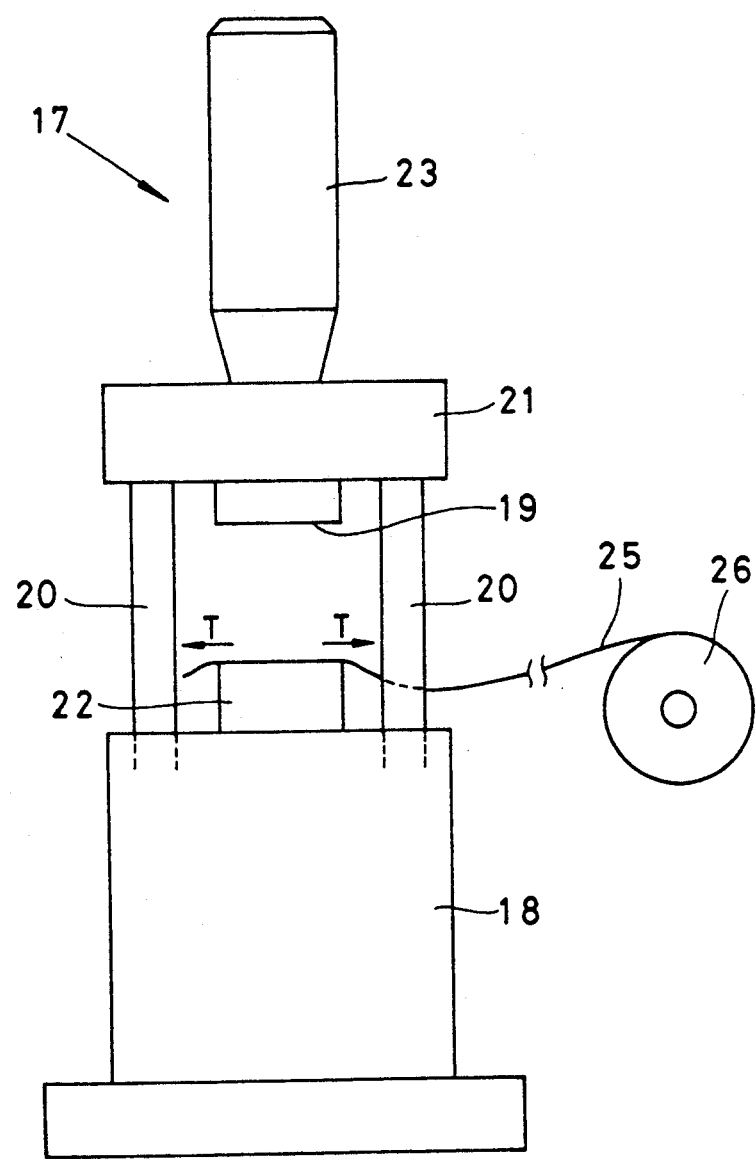
FIG. 20 is a front view of an injection molding machine for fabricating the suspension units shown in FIGS. 17 to 19.

The suspension unit 15 is formed using an injection molding machine 17 shown in FIG. 20. As shown, the injection molding machine 17 comprises a stationary base 18 to which a lower or A molding die 19 is mounted and a movable base 21 arranged for movement to and from the stationary base 18 by the action of rods 20 of a hydraulic cylinder device and to which a lower or B molding die 22 which produces a molding space in combination with the A molding die 19 is mounted. The movable base 21 is provided with an injecting means 23 for injection of a given amount of the molten resin material into the molding space between the two molding dies 19 and 22. The injecting means 23 may contain a system for supply of the elastomer engineering plastic material for forming the viscoelastic members 8, 9 in addition to the system for supply of the resin material. Otherwise, two injection molding machines may be used for producing the resilient members 153 and the viscoelastic members 8, 9 respectively at two different steps. Also, a drum 26 for feeding lines of wire 25 is provided on the side of the injection molding machine 17, as shown in FIG. 20.

Figure 17:
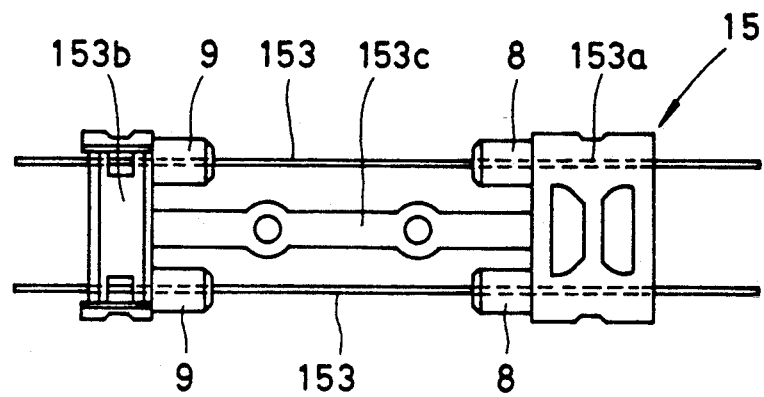
FIG. 17 is a back view of a suspension unit of the mechanism illustrated in FIG. 4.
Figure 18:
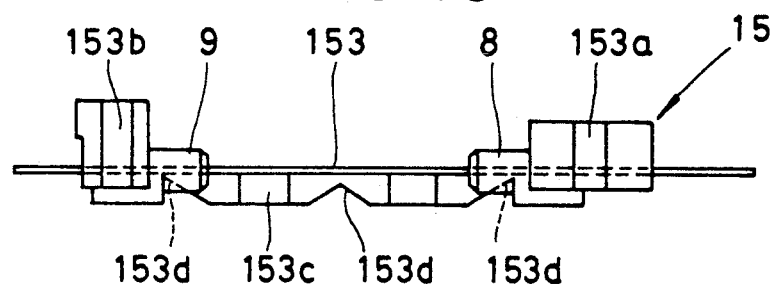
FIG. 18 is a plan view of the suspension unit shown in FIG. 17.
Figure 19:
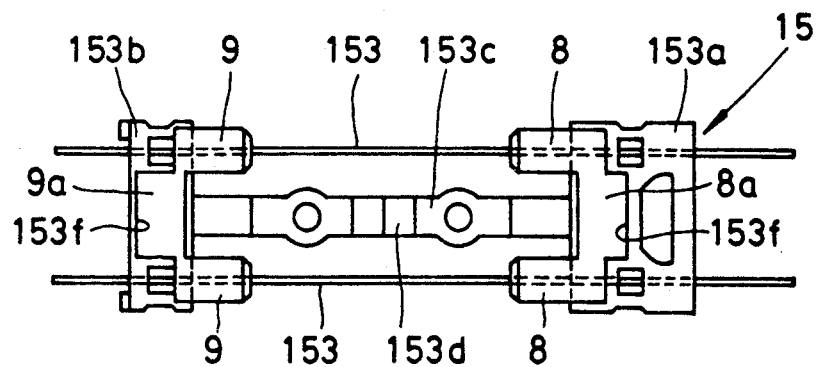
FIG. 19 is a front view of the suspension unit shown in FIG. 17.
Figure 21:
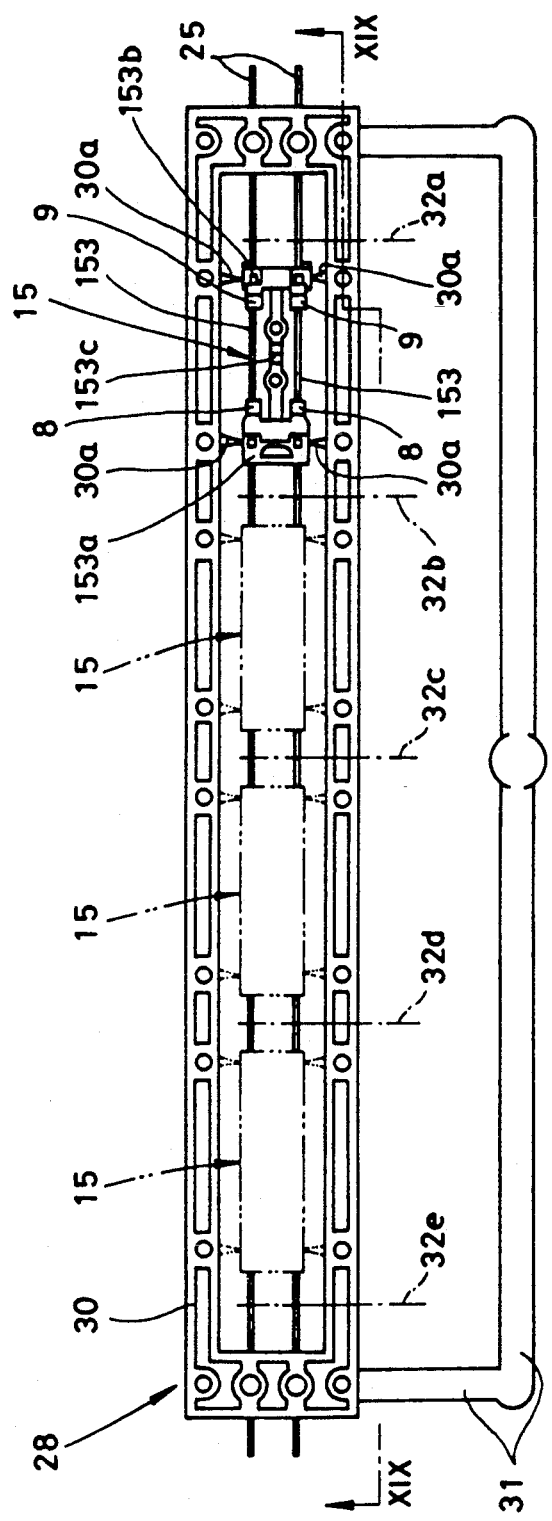
FIG. 21 is a plan view of an insert-molding component formed by the injection molding machine of FIG. 20.
Figure 22:
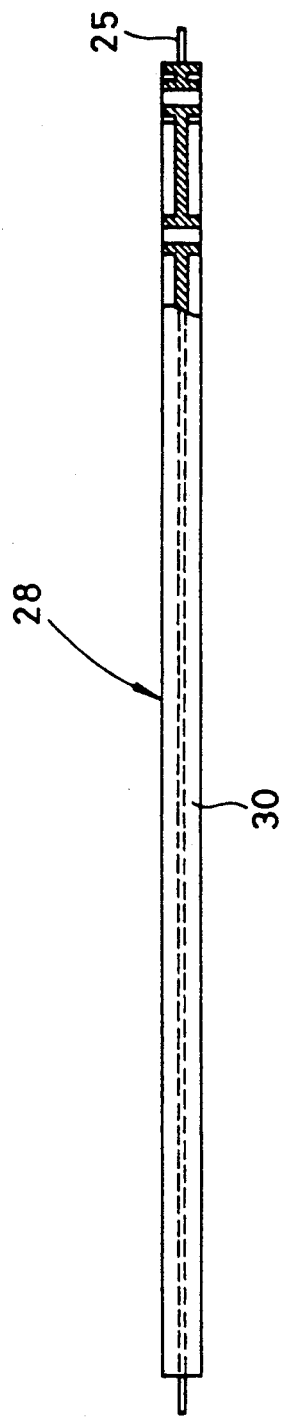
FIG. 22 is a view taken along the line XIX—XIX of FIG. 21.

In action, the injection molding machine 17 produces an insert-molding component 28 illustrated in FIGS. 21 and 22. As best shown in FIG. 21, the insert-molding component 28 contains four of the suspension units 15 aligned in a row and held by inwardly extending projections 30a of a rectangular frame 30. FIG. 21 shows one of the four suspension units 15 in detail while the others are schematically denoted by the two-dot chain lines. The frame 30 in FIG. 21 carries an excessive portion 31 which is a remainder of the resin solidified at a resin feeding passage between the molding dies during insert-molding and will be removed as unnecessary. Although the frame 30 with its projections 30a itself is an unnecessary part of which resin is solidified at a rectangular resin feeding loop for molding the joining blocks 153a and 153b, it is utilized as a protecting frame for transfer of the four suspension units 15 of a group to the succeeding step of a procedure with ease. At the succeeding step, the wires 25 of full length are cut at locations 32a to 32e to a desired length which represents the resilient member 153. Then, the joining blocks 153a, 153b are cut off from the projections 30a of the frame 30 thus separating the suspension unit 15. The two joining blocks 153a, 153b of the suspension unit 15 remain connected by a long, narrow bridge 153c to each other, as shown in FIGS. 17, 18, 19, and 21. The suspension unit 15 carrying the bridge 153c is bonded onto the upright 142a and the lens holder 148 (as shown in FIGS. 14 to 16). As an extra force for bonding is sustained by the bridge 153c, the resilient members 153 is less stressed and will thus be prevented from deflecting. The bridge 153c also accepts an external force exerted during the transfer of the insert-molding component 28 and will be removed from the two joining blocks 153a, 153b after the bonding is completed. More particularly, the bridge 153c has e.g. three recesses or thin regions 153d provided therein at center and both ends adjacent to the joining blocks 153a, 153b, as shown in FIGS. 18 and 19. In separating from the two joining blocks 153a and 153b, the thin regions 153d will readily be broken off with no difficulty easing the removal action. The thin regions 153d are not limited to the center and two ends and may be arranged in any appropriate locations of the bridge 153c.

The procedure of insert-molding the suspension unit 15 with the injection molding machine shown in FIG. 20 will now be explained.

The procedure starts with loading of the wires 25 fed from the drum 26 onto the B molding die 22, as shown in FIG. 20. Then, a tension T is applied by an unshown tensioning means to the two ends of loaded portions of the wires 25 on the B molding die 22. By tensioning in two opposite directions, the wires 25 which are resilient and thus, stay winding more or less are stretched out to a linear shape. The tension T is determined to a desired rate depending on the properties and diameter of the wires 25. Then, the rods 20 are retracted by the action of the cylinder device thus lowering the A molding die 19 for closing action. Accordingly, the wires 25 of a length are clamped at both ends between the upper and lower molding dies 19, 22 and will thus be prevented from dislocating or deforming by a pressure exerted during the injection of the resin material. The clamping of the wires 25 is preferably conducted by regions of the molding dies adjacent to a resin feeding gate to the suspension unit 15.

After closing of the A and B molding dies 19, 22, a predetermined amount of the molten resin material is injected by the injecting means 23 into the molding space between the dies 19, 22 and cooled down for curing. As the result, the two joining blocks 153a, 153b and the bridge 153c shown in FIGS. 17 to 19 are formed integral with the wires 25. Then, an elastomer engineering plastic material is injected by the injecting means 23 thus forming the viscoelastic members 8 and 9. In particular, two-stage molding with resin and elastomer engineering plastic materials is executed. As suggested previously, the two-stage molding with two different materials may be performed using two injection molding machines rather than one single injection molding machine.

The resin material for the joining blocks 153a, 153b is selected from materials which have a linear expansion coefficient equal to that of the wire 25 for the resilient members 153. This selection will prevent the wires 25 from being deflected by a difference in the linear expansion coefficient between the two materials, resin and wire, during cooling operation after the injection.

Often, the resin and the elastomer engineering plastic are not compatible with each other. For compensation, the bonding between the joining blocks 153a, 153b and the viscoelastic members 8, 9 is encouraged by the following arrangement.

The two joining blocks 153a, 153b have engaging recesses 153e, 153f thereof respectively which are fitted onto the projection 8a, 9a of their respective viscoelastic members 8, 9, as shown in FIG. 19. Accordingly, the two joining blocks 153a, 153b are securely engaged with their respective viscoelastic members 8, 9.

Also, the lens holder 148 has notches 148c provided in the two, left and right, sides thereof for ease of positioning, as shown in FIG. 6. The notches 148c are arranged for engagement with corresponding portions of the joining blocks 153b so that the joining blocks 153b can be coupled in position to the lens holder 148. Also, the actuator base 142 may have notches (in the upright wall 142a) thereof for engagement with projections of the joining blocks 153a so that the actuator base 142 and the joining blocks 153a can be coupled in position to each other. Furthermore, such positioning notches may be arranged in the joining blocks 152a, 153b.

Figure 23:
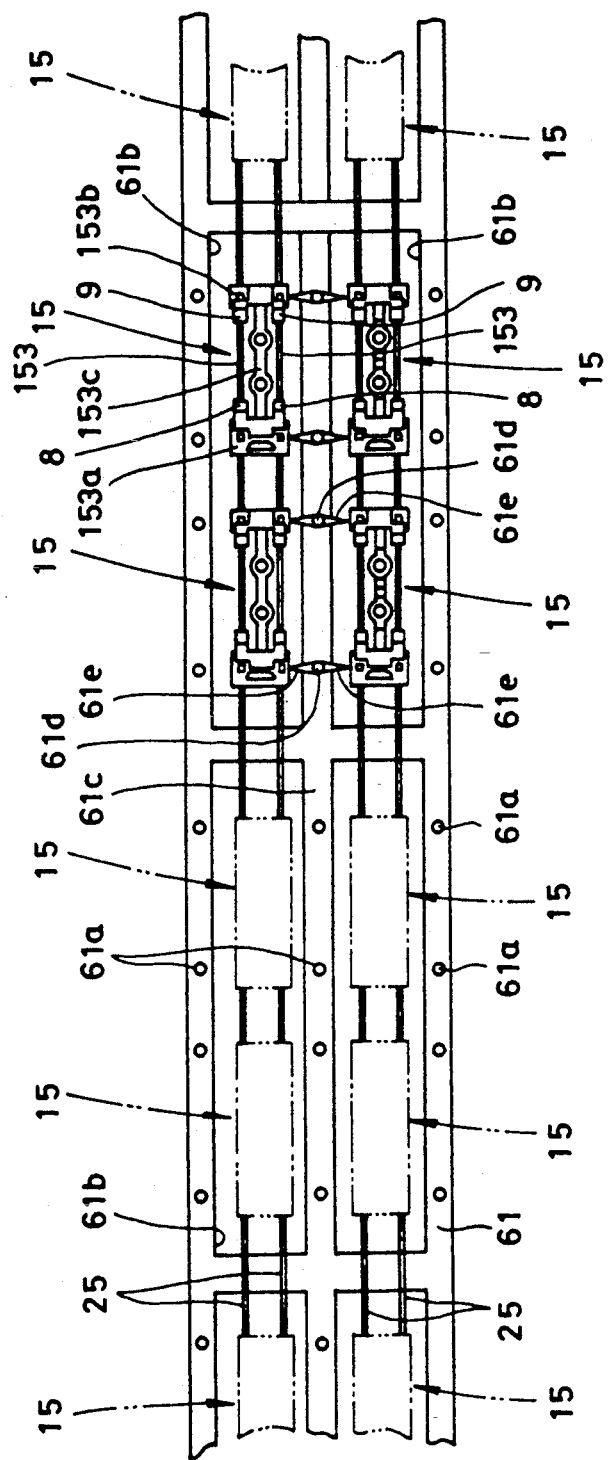
FIG. 23 is a plan view of another insert-molding component which is different from the insert-molding component shown in FIG. 21.

Instead of injection molding the insert-molding component 28 containing the four suspension units 15 with the frame 30 of the resin material (shown in FIGS. 21 and 22), another method will be employed, if desired, in which the suspension units 15 are formed by insert-molding on a belt-like frame 61 made of a thin stripe of stainless steel or copper, as shown in FIG. 23. Using the belt-like frame 61 which is transferred in succession, the entire procedure of production from an insert-molding step to its succeeding steps can be executed automatically and continuously. Also, when the frame 61 is formed of a material equal in the linear expansion coefficient to the wires 25, unwanted deflection of the wires 25 resulting from the linear expansion coefficient difference (a difference in expansion or shrinkage) during cooling will be avoided. The frame 61 is transferred by an unshown feeder mechanism. More specifically, the frame 61 has a series of pilot slots 61a therein for positioning during the transfer movement. Also, the frame 61 has two, left and right, rows of rectangular openings 61b arranged therein so that each can accommodate two of the suspension units 15. A series of slots 61d are provided in the intermediate portion 61c of the frame 61 between the left and right openings 61b for accepting projections 61e of the resin material which are formed by insert-molding and connected to the joining blocks 153a, 153b of the suspension units 15. The suspension units 15 can thus be separated from the frame 61 by eliminating the projections 61e. It should be understood that the wires 25 are cut to a given length at preparatory stage prior to the separation of the suspension units 15, similar to that shown in FIG. 21.

Figure 24:
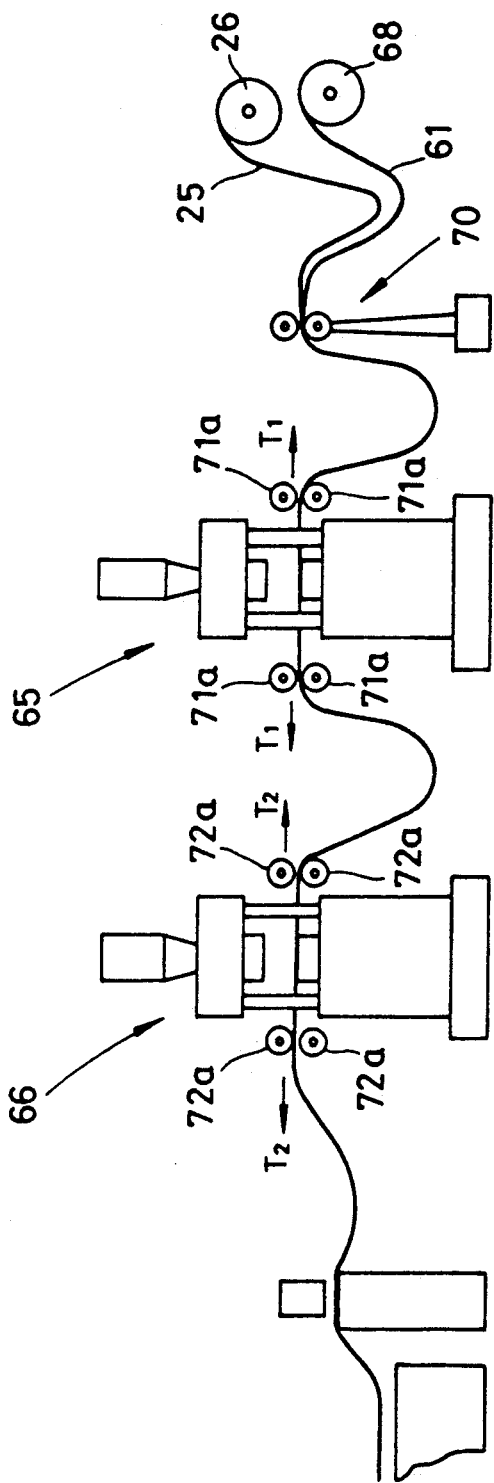
FIG. 24 is a plan view of a system for fabricating the insert-molding components shown in FIG. 23.

The insert-molding shown in FIG. 23 is performed with a system shown in FIG. 24, in which two of injection molding machines 65 and 66 are aligned in a row. The injection molding machines 65, 66 are almost identical in construction to the injection molding machine 17 shown in FIG. 20 and will no longer be explained in detail. There are two drums 26 and 68 for supply of the wire 25 of full length and the frame 61 of a belt shape respectively provided on the loading side of the two injection molding machines 65, 66. Also, a feeder mechanism 70 for parallel feeding of the wires 25 and the frame 61 as shown in FIG. 23 is interposed between the drums 26, 68 and the injection molding machines 65, 66. The injection molding machines 65, 66 are accompanied closely with two groups of tension rollers 71a, 72a respectively which serve as tensioning means (not particularly illustrated) for application of tensioning forces T1 and T2 onto the frame 61 and the wire 25 respectively.

The procedure of insert-molding on the system shown in FIG. 24 will be described.

The wires 25 and the frame 61 are fed from their respective drums 26, 68 and loaded through the feeder mechanism 70 into the injection molding machine 65 where resin portions or namely, two joining blocks 153a, 153b and a bridge 153c of each suspension unit 15 shown in FIG. 23 are insert molded together with metal lengths of the wires 25. At each insert-molding action, a desired number or e.g. twenty of the suspension units 15 are formed simultaneously. Then, a finished group of the suspension units 15 is transferred to the second injection molding machine 66 by advancing the frame 61 (with the wires 25). As the frame 61 and the wires 25 are advanced, the first injection molding machine 65 also produces another group of the suspension units 15 in succession.

The second injection molding machine 66 delivers an amount of the elastomer engineering plastic to produce the viscoelastic members 8, 9 of the suspension units 15 shown in FIG. 23.

Through execution of a series of the foregoing steps, an insert-molding component shown in FIG. 23 is fabricated. Then, the frame 61 with the wires 25 is cut to segments of a given length which are in turn transferred to the next step where the wires 25 are trimmed to produce the suspension units 15 shown in FIGS. 17 to 19. The suspension units 15 are then assembled with other components to complete the lens drive apparatus shown in FIGS. 4 to 7.

As set forth above, the lens drive apparatus and its producing method according to the present invention are arranged in which the movable optical system containing an objective lens and the stationary base are coupled by the elongated resilient members which serve as suspensions and are provided at both ends with the joining members made of a resin material. In particular, the resilient members and the joining members are formed in combination by insert-molding.

Accordingly, their assembly can be executed with ease through bonding the joining members which are comparatively large in size to both the stationary base and the movable optical system. Such a traditional troublesome action for directly mounting the resilient members which are small in size and require a great care during assembly will be eliminated. Hence, the assembly work will demand no particular skill and be performed using less steps and with much ease, thus increasing the productivity.

Also, the joining members are large in the size and can thus carry with no difficulty positioning projections for accurate coupling between the stationary base and the movable optical system. The joining members are also mounted to the resilient members at high positional accuracy due to the insert-molding technique. Hence, the positional relation between the stationary base and the movable optical system will highly be enhanced in accuracy and the yielding rate of production will be increased.

Furthermore, the method of the present invention will be applicable to an automatic assembly line.

What is claimed is:

1. A lens drive apparatus having a movable optical system containing an objecting lens movably coupled by elongated resilient suspension members to a stationary base, wherein said resilient members have at both ends a pair of joining members of a resin material directly bonded to said movable optical system and said stationary base, respectively, and wherein said ends of said resilient members are moldingly embedded within said joining members for high positional accuracy and increased manufacturing productivity.

2. A lens drive apparatus according to claim 1, wherein said joining members are heat resistant.

3. A lens drive apparatus according to claim 1 or 2, wherein said resilient members are formed of metal wire.

4. A method of producing a lens drive apparatus which has a movable optical system containing an objective lens movably coupled by elongated resilient suspension members to a stationary base, comprising the steps of insert-molding in combination said resilient members and a pair of joining members of a resin material arranged for coupling the two ends of said resilient members to said movable optical system and said stationary base respectively, and fixedly bonding one of said two joining members to said movable optical system and the other to said stationary base.

5. A method according to claim 4, further comprising the step of insert-molding viscoelastic members to be fitted onto said resilient members.

6. A method according to claim 4 or 5, in which said resilient members and said joining members are formed of two different materials which are equal in the linear expansion coefficient.

7. A method according to claim 5, wherein said resilient members and said viscoelastic members have fitting portions for close engagement with each other.

8. A method according to claim 4, further comprising the steps of integrally forming a bridge between said two joining members during insert-molding of said resilient members and said joining members, and after fixedly bonding said two joining members to said movable optical system and said stationary base respectively, separating said bridge from said two joining members.

9. A method according to claim 8, wherein said bridge has at least one thin region to facilitate separating said bridge from said two joining members.

10. A method according to claim 4 further comprising the steps of applying a tension to said resilient members prior to the step of insert-molding said resilient members and said joining members.

11. A method according to claim 4, in which at the step of insert-molding said resilient members and said joining members, said resilient members are clamped in pressure contact between two molding dies as the dies are closed.

12. A method according to claim 4 wherein said movable optical system and said stationary base have positioning portions for mounting said joining members to said movable optical system and said stationary base.

13. A method according to claim 4, wherein said joining members are provided with positioning portions for mounting said joining members to said movable optical system and said stationary base.

14. A method of producing a lens drive apparatus which has a movable optical system containing an objective lens movably coupled by elongated resilient suspension members to a stationary base, comprising the steps of preparing and feeding in parallel said resilient members of full length and a belt-like frame which has a multiplicity of rectangular openings aligned in rows, fixedly bonding said resilient members and said frame to each other, insert-molding in combination said resilient members and a pair of joining members of a resin material arranged for coupling said two ends of said resilient members to said movable optical system and said stationary base respectively within said openings, cutting said resilient members of full length at the outer side of each joining member, and fixedly bonding one of said two joining members to said movable optical system and the other to said the stationary base.

* * * * *